UNITED STATES PATENT OFFICE.

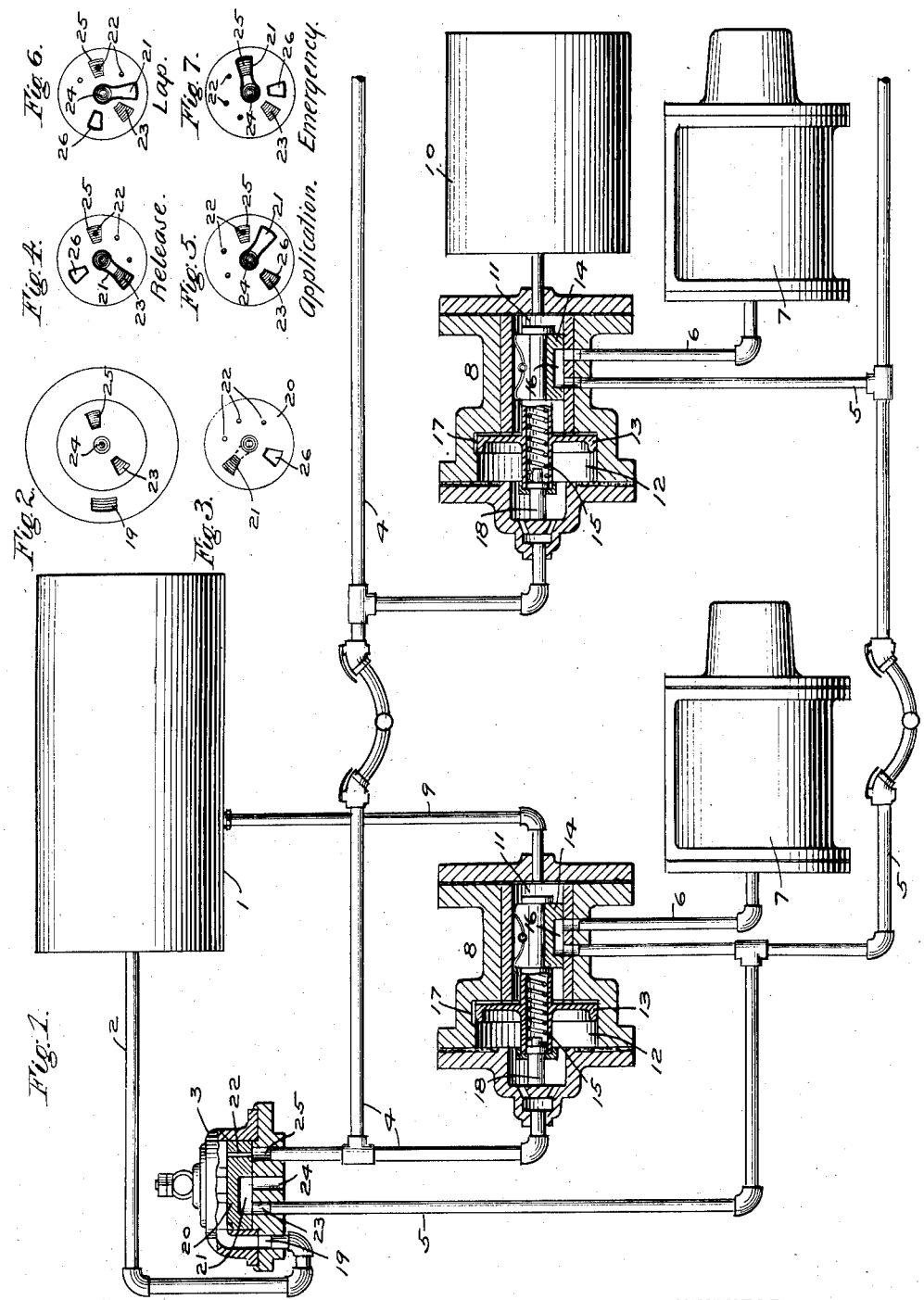

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

AIR-BRAKE.

No. 882,918.      Specification of Letters Patent.      Patented March 24, 1908.

Application filed June 10, 1905. Serial No. 264,625.

*To all whom it may concern:*

Be it known that I, WALTER V. TURNER, a citizen of the United States, residing in Wilkinsburg, in the county of Allegheny and State of Pennsylvania, have invented a certain new and useful Improvement in Air-Brakes, of which the following is a specification.

This invention relates in general to fluid pressure brakes, and more particularly to apparatus of this character adapted to be applied to electrically propelled cars which are usually operated singly or in trains of only two or three cars. In this class of service, the so-called straight air brake, in which the motorman's brake valve controls the supply of air from the main reservoir directly to the brake cylinder and its release therefrom, has heretofore been employed as being the cheapest, most flexible and readily manipulated device. Where one or two trailers are hauled by the motor car, however, this system is subject to the objection that in case of a bursted hose, the pulling apart of the cars, or other accident, the brakes will not apply automatically, and furthermore, that the motorman is powerless to apply the brake, as the brake cylinders are in open communication with the atmosphere.

The object of my invention, therefore, is to overcome this defect in a straight air brake system and provide means whereby the motorman may always be able to instantly apply the brakes in case of any emergency, and also adapted to apply automatically in case of such an accident as a bursted hose or a breaking apart of the train.

With this object in view, my invention comprises in addition to the usual straight air brake features, a train pipe adapted to be normally charged to a certain pressure, and a valve device operated by a reduction in the train pipe pressure for cutting off communication from the brake cylinder through the straight air brake pipe and for supplying air to the brake cylinder. This and other features of my invention will be hereinafter more fully described and claimed.

In the accompanying drawing, Figure 1 is a diagrammatic representation of a combined automatic and straight air brake system as applied to a train of two cars, and embodying my improvements, the valve devices being shown in vertical section; Fig. 2 a plan view of the valve seat of the motorman's brake valve; Fig. 3 a face view of the rotary valve, and Figs. 4, 5, 6 and 7 diagrams illustrating the relative positions of the ports of the brake valve in the respective positions of "release," "application," "lap," and "emergency."

The drawing shows the improved brake apparatus as adapted to be applied to a train of two cars, one motor car and a trailer, and comprising a main reservoir 1, motorman's brake valve 3, straight air pipe 5, automatic valve device or triple valve 8, train pipe 4, and pipe 6 leading from the triple valve device to the brake cylinder 7.

The motorman's brake valve is adapted to control the supply of air from the main reservoir, or source of pressure, to, and its release from the brake cylinder through the straight air pipe, and also to maintain the feed to the train pipe and the automatic valve devices.

According to the preferred construction, as shown in the drawing, the motorman's brake valve is of the rotary type having port 19 communicating with pipe 2 and the main reservoir supply, port 23 communicating with straight air pipe 5, port 25 with train pipe 4, and exhaust port 24 with the atmosphere, while rotary valve 20 contains through ports 26 and 22 and cavity 21.

The automatic valve device 8 is normally in position to maintain free and open communication through pipes 5 and 6 with the brake cylinder, and is preferably of the plain triple valve type having piston chamber 12 and valve chamber 11 containing piston 13 and slide valve 14; the piston chamber having a small equalizing groove 17 around the piston in its normal position and communicating with train pipe 4, while the valve is provided with a cavity 16 for connecting pipes 5 and 6.

A yielding resistance device, such as spring 15 and stem 18, is preferably employed for retaining the valve and piston in its normal inner position, as shown. The valve chamber 11 may communicate with an auxiliary reservoir 10, as indicated on the trailer car, or may connect through pipe 9 with the main reservoir as shown on the motor car, it being designed in this latter instance to carry the same maximum degree of pressure in the main reservoir as in the train pipe and auxiliary reservoir.

If it is desired to carry a higher pressure in the main reservoir in excess of that in the train pipe, then it will be necessary to employ a reducing valve or feed valve between the main reservoir and train pipe and a separate auxiliary reservoir for the triple valve device on the motor car according to the usual practice, as will be readily understood.

Considering the brake valve in the normal release or running position, Fig. 4, and the pump in operation compressing air into the main reservoir 1, the pressure rises through pipe 2, ports 19, 22 and 25, train pipe 4, piston chamber 12, equalizing groove 17, valve chamber 11, and auxiliary reservoir 10, thereby charging the system to full normal pressure, the brake cylinders being open to the atmosphere through pipe 6, cavity 16 in valve 14, straight air pipe 5, port 23, cavity 21, and exhaust port 24 of the motorman's brake valve.

The brake may be applied in service by turning the brake valve to application position, Fig. 5, in which the exhaust cavity 21 is disconnected from the pipe 5 and the port 26 registers with port 23, thereby supplying air from the main reservoir to pipe 5 through cavity 16 of the slide valve 14 and pipe 6 to the brake cylinder 7, charging the same to any desired degree, after which the brake valve is turned to lap position, Fig. 6, in which port 23 is closed. It will be noticed that in each of the positions of release, application, and lap, one of the small ports 22 registers with the port 25 communicating with the train pipe 4, so that when a direct application of the brakes is made the pressure in the train pipe, automatic valve devices and auxiliary reservoirs may be maintained. Should there be any tendency for air to flow from the train pipe back through the port 22 to the brake valve chamber at the time of making an application with straight air, the pressure from the auxiliary reservoir will readily equalize through groove 17 around the piston 13 back into the train pipe without moving the piston, since the spring 15 holds the same in its normal position under slight or gradual changes in pressure.

The brakes may be released by turning the brake valve to release position, or may be graded down by turning the valve alternately to release and lap positions in the usual way.

An automatic or emergency application may be made at any time by turning the brake valve to the emergency position, Fig. 7, in which the train pipe port 25 is connected directly to the exhaust port 24 through the large cavity 21, thereby suddenly exhausting the train pipe to the atmosphere and causing the pistons of the triple valve devices to move out against the springs 15 and actuate the valves 14 to cut off connection between pipes 5 and 6 and to open communication from the valve chamber through pipe 6 to the brake cylinder. Air from the auxiliary reservoir or other reservoir then immediately expands into the brake cylinder and applies the brake with full force. This same emergency action will be produced automatically by the bursting of a hose, the pulling apart of the cars of the train, or other accident causing a sudden venting of the train pipe to the atmosphere. The brakes may then be released after an emergency application by returning the brake valve to normal release position whereupon the pressures equalize upon opposite sides of piston 13 of the emergency valve and the spring 15 then moves the valve 14 to its normal position so that the pressure from the brake cylinder may then discharge to the atmosphere through pipes 5, 6, and the exhaust port 24 of the brake valve in the usual manner.

It will now be apparent that my improved apparatus possesses all the advantages of simplicity and flexibility of the straight air brake system and also retains the safety features of the automatic system.

Having now described my invention, what I claim as new and desire to secure by Letters Patent is:—

1. In an air brake apparatus, the combination with a main reservoir, train pipe, straight air pipe, and brake cylinder, of a brake valve for controlling the supply of air from the main reservoir to the straight air pipe and to the train pipe, and a valve device operated by a reduction in train pipe pressure for closing communication through the straight air pipe and for supplying air to the brake cylinder.

2. In an air brake, the combination with a main reservoir, train pipe, straight air pipe, and brake cylinder, of a brake valve having means for controlling the supply and release of air to and from the straight air pipe and the supply and release of air to and from the train pipe, and a valve device operated by a reduction in train pipe pressure for closing communication through the straight air pipe to the brake cylinder and for supplying air to the brake cylinder.

3. In an air brake, the combination with a main reservoir, train pipe, straight air pipe, and brake cylinder, of a brake valve having means for controlling the supply of air through the straight air pipe to the brake cylinder and for supplying air to the train pipe while the brake is applied with straight air, and a valve device subject to the train pipe pressure for also controlling communication through the straight air pipe.

4. In an air brake, the combination with a main reservoir, train pipe, straight air pipe, and brake cylinder, of a brake valve having ports for controlling the supply and release of air to and from the brake cylinder through the straight air pipe, and for supplying air to the train pipe when the straight air brake is applied, and a valve device operated by a reduction in train pipe pressure for closing communication through the straight air pipe and for supplying air to the brake cylinder.

5. In an air brake, the combination with a main reservoir, train pipe, straight air pipe and brake cylinder, of a brake valve for controlling the supply of air from the main reservoir to the straight air pipe and brake cylinder, and an automatic valve device operated by a reduction in train pipe pressure for opening communication from the main reservoir to the brake cylinder.

6. In an air brake, the combination with a main reservoir, a train pipe, a straight air pipe and brake cylinder, of an emergency valve device normally establishing communication between the straight air pipe and brake cylinder, but operated by a sudden reduction in train pipe pressure to cut off said communication and to open communication from the main reservoir to the brake cylinder, and a motorman's brake valve having means for controlling the supply of air from the main reservoir to the straight air pipe independently of the emergency valve device.

7. In an air brake, the combination with a main reservoir, a train pipe, a straight air pipe and brake cylinder, of an emergency valve device normally establishing communication between the straight air pipe and brake cylinder, but operated by a sudden reduction in train pipe pressure to cut off said communication and to open communication from the main reservoir to the brake cylinder, a pipe connection from the main reservoir to the straight air pipe independent of the emergency valve, and a motorman's brake valve for controlling the supply of air to and its release from the straight air pipe.

8. In an air brake, the combination with a main reservoir, a train pipe, a straight air pipe, and brake cylinder, of a spring actuated emergency valve normally establishing communication from the straight air pipe to the brake cylinder but arranged to cut off said communication and to open communication from the main reservoir to the brake cylinder upon a sudden reduction in train pipe pressure, a motorman's brake valve for controlling the supply of air from the main reservoir to the straight air pipe, and a direct pipe connection from the main reservoir to the motorman's brake valve independent of the emergency valve.

9. In an air brake, the combination with a reservoir, train pipe, straight air pipe and brake cylinder, of a brake valve having connections and ports for controlling the supply of air from the reservoir to the straight air pipe, and an emergency valve device normally establishing communication from the straight air pipe to the brake cylinder but operating under a reduction in train pipe pressure to cut off said communication and to supply air from said reservoir to the brake cylinder.

10. In an air brake, the combination with a reservoir, train pipe, straight air pipe and brake cylinder, of an emergency valve device normally establishing communication from the straight air pipe to the brake cylinder, but adapted to operate under a sudden reduction in train pipe pressure to close said communication and open communication from the reservoir to the brake cylinder, and a brake valve having ports for controlling the supply and release of air to and from the straight air pipe in straight air applications, and for controlling the release of air from the train pipe and the supply of air to the train pipe for applying and releasing brakes in emergency applications.

11. In an air brake, the combination with a reservoir, train pipe, straight air pipe and brake cylinder, of an emergency valve normally establishing communication from the straight air pipe to the brake cylinder, but adapted to operate under a sudden reduction in train pipe pressure to close said communication and open communication from the reservoir to the brake cylinder, and a motorman's brake valve having pipe connections with the reservoir, the straight air pipe, and the train pipe.

In testimony whereof I have hereunto set my hand.

WALTER V. TURNER.

Witnesses:
R. F. EMERY,
J. B. MACDONALD.